(12) United States Patent
Ng et al.

(10) Patent No.: US 8,245,210 B2
(45) Date of Patent: Aug. 14, 2012

(54) COMPILE-TIME CONTEXT FOR DYNAMICALLY BOUND OPERATIONS

(75) Inventors: Samuel Ng, Bellevue, WA (US); Mads Torgersen, Issaquah, WA (US); Martin Maly, Seattle, WA (US); Christopher Joseph Burrows, Seattle, WA (US); James Hugunin, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 754 days.

(21) Appl. No.: 12/470,746

(22) Filed: May 22, 2009

(65) Prior Publication Data

US 2010/0299658 A1    Nov. 25, 2010

(51) Int. Cl.
*G06F 9/45* (2006.01)
(52) U.S. Cl. ......... 717/153; 717/140; 717/151; 717/152
(58) Field of Classification Search .................. 717/140, 717/151–153; 370/400
See application file for complete search history.

(56) References Cited

U.S. PATENT DOCUMENTS

| | | | |
|---|---|---|---|
| 7,219,329 B2 | 5/2007 | Meijer et al. | |
| 7,493,610 B1 | 2/2009 | Onodera et al. | |
| 7,957,332 B1* | 6/2011 | Chow et al. | 370/311 |
| 2004/0255268 A1* | 12/2004 | Meijer et al. | 717/106 |
| 2005/0114848 A1* | 5/2005 | Choi et al. | 717/148 |
| 2005/0154978 A1 | 7/2005 | Albornoz et al. | |
| 2006/0053131 A1* | 3/2006 | Meijer et al. | 707/101 |
| 2008/0320453 A1 | 12/2008 | Meijer et al. | |
| 2009/0024986 A1 | 1/2009 | Meijer et al. | |
| 2009/0037895 A1 | 2/2009 | Le Roy | |
| 2010/0235810 A1* | 9/2010 | Campbell et al. | 717/106 |

OTHER PUBLICATIONS

When Generic Function Use Dynamic Values, Achten et al., 2003, p. 17-33.*
C# Language Specification, Microsoft Mar. 2009, p. 2-7.*
"Dynamic Language Runtime", Retrieved at <<http://en.wikipedia.org/wiki/Dynamic_Language_Runtime>>, Dec. 10, 2008, pp. 2.
Taft, Darryl K., "Microsofts Dynamic Language Leaders Speak", Retrieved at <<http://www.eweek.com/c/a/Application-Development/Microsofts-Dynamic-Language-Leaders-Speak/>>, Apr. 30, 2007, pp. 3.
Chiles, Bill, "Dynamic Language Runtime: Hosting Overview", Retrieved at <<http://compilerlab.members.winisp.net/hosting-tour.doc>>, pp. 1-25.
"Generating Class Types", Retrieved at <<http://dlr.codeplex.com/Thread/View.aspx?ThreadId=47024>>, Apr. 7, 2009, pp. 3.
Maly, Martin, "Building Languages With the Dynamic Language Runtime", Retrieved at <<http://www.langnetsymposium.com/2008/talks/Slides/Targeting%20DLR.pdf>>, presented at TechEd Europe in Barcelona, Nov. 7, 2007, pp. 27.

(Continued)

*Primary Examiner* — Lewis A Bullock, Jr.
*Assistant Examiner* — Tina Huynh
(74) *Attorney, Agent, or Firm* — Ogilvie Law Firm

(57) ABSTRACT

Compile-time context information is captured and provided to a runtime binder for dynamic features in programming languages. For example, a C# run-time binder uses the information to perform a run-time bind with semantics matching the compiler's binding behavior. Dynamic programming language features supported relate to compound operations, events, delegates, member accessibility, dynamic-typed objects, structs passed by ref, arguments passed by name rather than position, extension methods, conditionally compiled methods, literal arguments, overflow checking, dynamic indexed properties, dynamic method groups, and static method groups.

20 Claims, 2 Drawing Sheets

OTHER PUBLICATIONS

Burrows, Christopher, "Chris Burrows' Blog", Retrieved at <<http://blogs.msdn.com/cburrowsarchive/2008/10/27/c-dynamic.aspx>>, Oct. 27, 2008, pp. 12.

"Inside C# 4.0: dynamic typing, optional parameters, covariance and contravariance", Retrieved at <<http://channel9.msdn.com/shows/Going+Deep/Inside-C-40-dynamic-type-optional-parameters-more-COM-friendly>>, Oct. 31, 2008, pp. 4.

"New features in C# 4.0", Retrieved at <<http://interviews.dotnetthread.com/2008/11/new-features-in-c-40⎯14.html>>, Nov. 14, 2008, pp. 10.

Ng, Samuel, "Sam Ng's Blog", Retrieved at <<http://blogs.msdn.com/samng/archive/2008/10/29/dynamic-in-c.aspx>>, Oct. 29, 2008, pp. 11.

Ng, Samuel, "Sam Ng's Blog", Retrieved at <<http://blogs.msdn.com/samng/archive/2008/11/02/dynamic-in-c-ii-basics.aspx>>, Nov. 2, 2008, pp. 9.

Ng, Samuel, "Sam Ng's Blog", Retrieved at <<http://blogs.msdn.com/samng/archive/2008/11/06/dynamic-in-c-iii-a-slight-twist.aspx>>, Nov. 6, 2008, pp. 5.

Ng, Samuel, "Sam Ng's Blog", Retrieved at <<http://blogs.msdn.com/samng/archive/2008/11/09/dynamic-in-c-iv-the-phantom-method.aspx>>, Nov. 9, 2008, pp. 5.

Ng, Samuel, "Sam Ng's Blog", Retrieved at <<http://blogs.msdn.com/samng/archive/2008/12/11/dynamic-in-c-v-indexers-operators-and-more.aspx>>, Dec. 11, 2008, pp. 5.

Ng, Samuel, "Sam Ng's Blog", Retrieved at <<http://blogs.msdn.com/samng/archive/2008/12/15/dynamic-in-c-vi-what-dynamic-does-not-do.aspx>>, Dec. 15, 2008, pp. 10.

Ng, Samuel, "Sam Ng's Blog", Retrieved at <<http://blogs.msdn.com/samng/archive/2008/12/24/dynamic-in-c-vii-phantom-method-semantics.aspx>>, Dec. 24, 2008, pp. 5.

* cited by examiner

US 8,245,210 B2

COMPILE-TIME CONTEXT FOR DYNAMICALLY BOUND OPERATIONS

BACKGROUND

In computer science, "compile-time" operations performed by a compiler often include syntax analysis, semantic analysis such as type checks, and code generation, for example. Programming language definitions may specify compile-time requirements that program source code will meet in order to compile. For instance, in some situations the amount of storage required by types and variables is determined at compile-time. Program properties investigated at compile-time may include array bound range-checks, deadlock-checks in concurrent languages, and estimates of required execution time, for example.

"Run-time" operations occur after compile-time. A run-time environment (a.k.a. "runtime environment" or simply "runtime") provides software services for programs while they execute in a computer. In a given system, run-time activities may include loading and linking the classes needed to execute a program, optional machine code generation, program optimization, and actual program execution, for example.

SUMMARY

Adding dynamic language features to a software development environment, such as features that postpone binding of types from compile-time to run-time, can provide programmers with flexibility and functionality. However, such dynamic features may rely on supporting changes to compilers and/or to runtimes. Some embodiments described herein transform selected compile-time context data into semantics payloads for operation binding at run-time to support dynamic language features. Particular dynamic programming language features are supported with corresponding context data which is collected at compile-time and then provided to a run-time binder. For example, compile-time context data may be provided in the form of one or more of the following: a compound-operation-event-add payload portion, a compound-operation-event-remove payload portion, a compound-operation-delegate-combine payload portion, a compound-operation-delegate-remove payload portion, a member-accessibility payload portion, a dynamic-typed-object payload portion, a struct-by-ref payload portion, an argument-by-name payload portion, an extension-method-scope payload portion, a conditional-compiled-method payload portion, an argument-is-literal payload portion, an overflow-check-selection payload portion, a dynamic-indexed-property payload portion, a dynamic-method-group payload portion, a static-method-group payload portion. Payload portions to support dynamic features may be provided to multiple run-time binders for multiple corresponding programming languages used by a given program. Dynamic features may be supported by a C-sharp programming language run-time binder, a Ruby programming language run-time binder, an Iron Python programming language run-time binder, and/or other programming language run-time binders.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
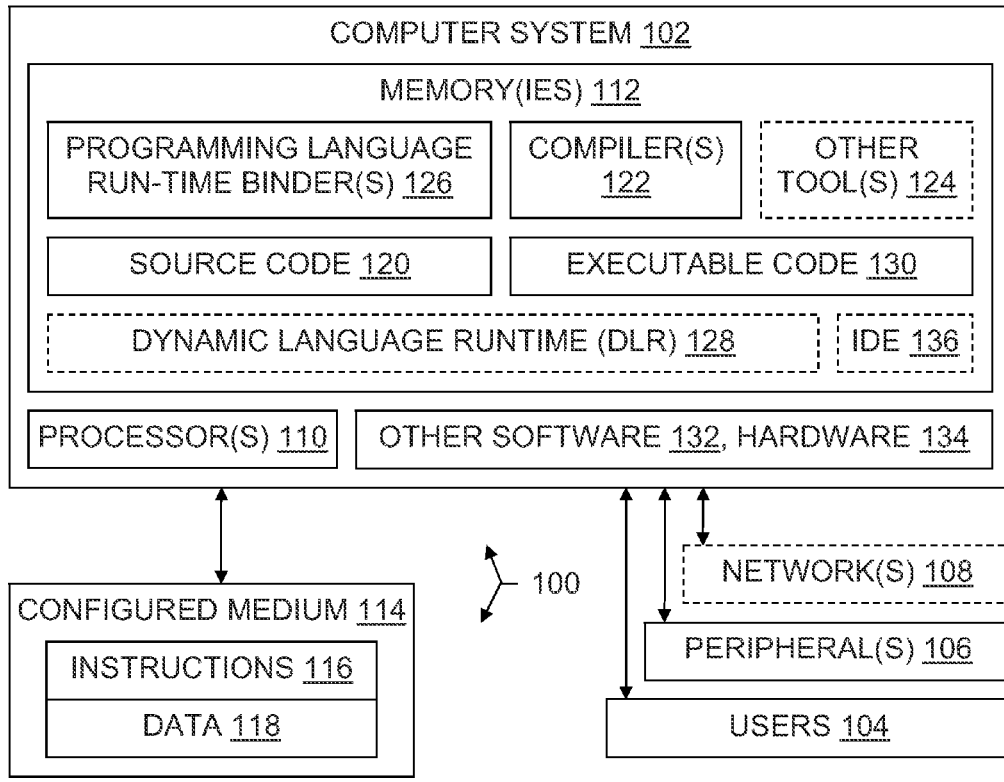
FIG. 1 is a block diagram illustrating a computer system having at least one processor, at least one memory, at least one compiler for creating one or more applications, at least one run-time binder, and other items in an operating environment which may be present on multiple network nodes, and also illustrating configured storage medium embodiments.

With the introduction of dynamic features into the C# programming language, an opportunity was presented for C# to have identical semantics at compile-time and at run-time for a given dynamic feature. One challenge is to preserve context information, consistent with an existing Dynamic Language Runtime (DLR) protocol, to provide run-time binders with adequate information to perform a given run-time bind whose behavior matches the compiler semantics.

Some embodiments described herein encode C#-specific context information in a manner which interacts with the DLR to provide run-time dispatch, and interact with a C# run-time binder to allow matching compile-time and run-time semantics. Context information can also be preserved and provided for dynamic features in other programming languages. In some embodiments, an encoding is generated at compile-time in an Intermediate Language (IL) stream of a caller, and is propagated through the DLR dispatch framework to the C# run-time binder, which unpacks the information and uses it to determine the run-time semantics of the dynamic operations. Using the encoded information, the C# run-time binder is then able to perform a run-time bind with semantics matching the compiler's behavior.

Particular mechanisms are used to determine events and to determine member accessibility, for example. A challenge of encoding a compound operation is addressed by event handling, and a challenge of accessibility checking is addressed using accessibility context. Also addressed are a variety of other challenges regarding particular dynamic language features, which may be present in a given implementation of C# and/or other programming languages.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Run-time binder" or "runtime binder" means a software tool which performs overload resolution, by either binding overloaded program items to particular respective implementations after compile-time, or by raising a run-time exception or similar error condition if no type-compatible resolution is possible with the information available to the tool. Run-time binders are generally specific to a programming language.

"Compiler" means a software development tool which accepts program source code and performs syntactic and semantic analysis to facilitate executable code generation. The distinction sometimes made between compilers and interpreters is not important here; interpreters are considered a type of compiler herein. Some compilers predate and hence do not generate the particular semantic payload portions described herein, whereas other compilers discussed herein or otherwise encountered hereafter do generate one or more of the semantic payload portions described herein. Similarly, some run-time binders predate and hence do not recognize the particular semantic payload portions described herein, whereas other run-time binders discussed herein or encountered hereafter do recognize (and perform binding based on) one or more of the semantic payload portions described herein. Accordingly, each use of the term "compiler" and each use of the term "run-time binder" is to be considered in context before characterizing a given use of the term as referring to either an embodiment or a pre-existing technology.

"Kernels" include operating systems, hypervisors, virtual machines, run-time binders, dynamic language runtimes, other run-time environments, and similar hardware interface software.

"Code" means processor instructions, data (which includes constants, variables, and data structures), or both instructions and data.

Throughout this document, use of the optional plural "(s)" means that one or more of the indicated feature is present. For example, "payload portion(s)" means "one or more payload portions" or equivalently "at least one payload portion".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, and/or optical. In particular, a configured storage medium 114 such as a CD, DVD, memory stick, or removable non-transitory memory medium may become functionally part of the computer system when inserted or otherwise installed, making its content accessible for use by processor 110. The removable configured storage medium 114 is an example of a memory 112. Other examples of memory 112 include built-in RAM, ROM, hard disks, and storage devices which are not readily removable by users 104.

The storage medium 114 is configured with instructions 116 that are executable by a processor 110; "executable" is used in a broad sense herein to include machine code, interpretable code, and code that runs on a virtual machine, for example. The storage medium 114 is also configured with data 118 which is created, modified, referenced, and/or otherwise used by execution of the instructions 116. The instructions 116 and the data 118 configure the memory 112/storage medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by compilation, packaging into payload portions, binding, deployment, execution, modification, display, creation, loading, and/or other operations.

Memories 112 may be of different physical types. A program source code 120, compiler 122, other programming tools 124 (debugger, version control, profiler, and so on), programming-language-specific run-time binder 126, programming-language-independent dynamic language runtime 128, and program executable code 130, other software 132, and other items shown in the Figures may reside partially or entirely within one or more memories 112, thereby configuring those memories. An operating environment may also include other hardware 134, such buses, power supplies, and accelerators, for instance.

A given operating environment 100 may include an Integrated Development Environment (IDE) 136 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use dynamic programming language features.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
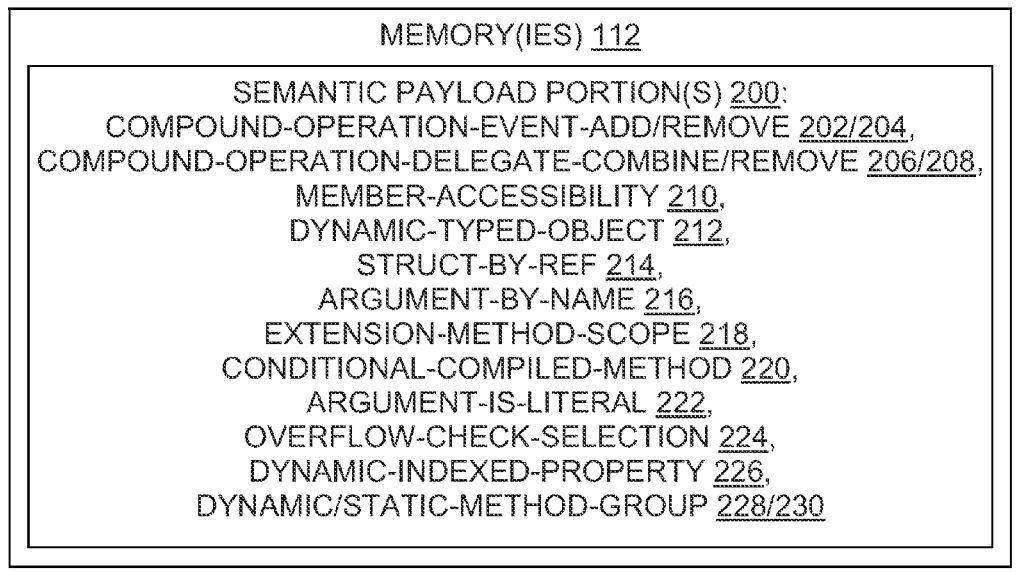
FIG. 2 is a block diagram illustrating semantic payload portions to support dynamic programming language features in an example architecture.

FIG. 2 illustrates an architecture which is suitable for use with some embodiments. As shown, a memory 112 is configured with one or more specific semantic payload portions 200. Particular dynamic programming language features are supported by corresponding context data which is collected by an enhanced compiler 122 at compile-time and provided to a suitably configured and enhanced run-time binder 126 in a payload portion 200. For example, compile-time context data may be provided in the form of one or more of the following: a compound-operation-event-add payload portion 202, a compound-operation-event-remove payload portion 204, a compound-operation-delegate-combine payload portion 206, a compound-operation-delegate-remove payload portion 208, a member-accessibility payload portion 210, a dynamic-typed-object payload portion 212, a struct-by-ref payload portion 214, an argument-by-name payload portion 216, an extension-method-scope payload portion 218, a conditional-compiled-method payload portion 220, an argument-is-literal payload portion 222, an overflow-check-selection payload portion 224, a dynamic-indexed-property payload portion 226, a dynamic-method-group payload portion 228, a static-method-group payload portion 230. Payload portions 200 to support dynamic features may be provided to multiple run-time binders 126 for multiple corresponding programming languages used by a single given program, in some environments.

In particular, the runtime-dispatch design of a DLR available from Microsoft gives its consumers the ability to perform certain well-defined standard operations. Some of these operations are considered basic building blocks of the current Microsoft .NET environment languages and of some .NET dynamic languages. These building blocks are generalized, and provide a base level of interoperability between languages. Some embodiments described herein enhance and expand on the facilities provided by the DLR to provide an additional layer of contextual information that is used when no language interoperability is required, and standard .NET objects are used.

In some embodiments, at compile-time a C# compiler 122 compiles a dynamic invocation such as a method call, a property access, a binary/unary operation, and so on. The compiler generates a C#-specific payload 304 to be passed to the DLR for the specific operation in question. In addition to the DLR basic requirements, the C# compiler encodes into its payloads context information such as the data discussed below.

With regard to event binding, compound operations present a challenge because of the syntactic transformations that the C# language specifies. For instance, the += operation is transformed into a delegate combination if the left hand side is a delegate, but is transformed into a simple assignment operation if the left hand side is an integer. The notion of a binding depending on the result of a previous binding is not expressed naturally in the familiar framework. For operations of the form d.P op=h, where op is one of + or −, in some embodiments a suitably enhanced C# compiler 122 encodes in a payload portion 200 an invocation to a runtime-evaluated method which checks if d.P evaluates to an event. This encoding is followed by an invocation to a DLR call site which add/removes the event specified. If d.P does not evaluate into an event, then the enhanced system performs the bind as a standard bind, e.g., as a numeric assignment.

With regard to literalness, in the C# language literal constants cause different binding behavior than other expressions with the same value. In some embodiments C# payload portion 200 encodes whether each argument represents a literal.

With regard to checked-ness, the C# language differentiates between checked and unchecked operations based on context. In some embodiments this differentiation is context data encoded in a C# payload portion 200.

With regard to accessibility, a member that is being dynamically invoked may or may not be accessible, depending on the location of the dynamic invocation. In some embodiments a suitably enhanced C# compiler 122 encodes the location of the call site into a payload portion 200 in the form of a type so that a suitably enhanced run-time binder 126 can use that location to determine accessibility. In some embodiments, the member-accessibility payload portion does not indicate the extent that the member is accessible. Rather, it indicates where the access originated from, so that at runtime based on that location, the system can determine whether or not the invocation location has access to the given member.

With regard to run-time types versus compile-time types, a C# dynamic feature specifies that if an expression is statically known to have the dynamic type, then a suitably enhanced run-time binder 126 will use the run-time type of the object. Otherwise, the run-time binder will use the statically determined type, regardless of whether or not the run-time type matches or not. This dynamic typing information is encoded into a payload portion 200 for each argument as well.

With regard to passing structs by ref, in some embodiments a dynamic invocation on a struct (e.g., s.M(d) where s is a struct type, d is a dynamically typed variable, and M is some method on s) is implemented with a payload portion 200 which indicates that the receiver 's' is to be passed by ref, since the invocation of M may mutate state.

With regard to argument named-ness, C# version 4.0 provides the ability to specify method arguments by name instead of by position. In some embodiments, argument names are encoded in a payload portion 200 so that a suitably enhanced run-time binder 126 can perform the binding with the given argument names.

Additional examples are discussed elsewhere herein. In these and other examples, after the enhanced run-time binder 126 receives the payload portion 200 containing information like that discussed above, for each invocation the binder can correctly perform a run-time bind which will produce the same semantic results as the compiler would have produced for an equivalent non-dynamic invocation.

With reference to FIGS. 1 and 2, some embodiments provide a computer system 102 with a logical processor 110 and a memory 112 configured by circuitry, firmware, and/or software to transform source code 120 context data into semantic payload portions 200 as described herein. For example, in some embodiments at least one enhanced run-time binder 126 configures memory 112 in operable communication with the logical processor 110, and at least one of the following payload portions 200 also configures memory and is accessible to the run-time binder: a compound-operation-event-add payload portion 202, a compound-operation-event-remove payload portion 204, a compound-operation-delegate-combine payload portion 206, a compound-operation-delegate-remove payload portion 208, a member-accessibility payload portion 210, a dynamic-typed-object payload portion 212, a struct-by-ref payload portion 214, an argument-by-name payload portion 216, an extension-method-scope payload portion 218, a conditional-compiled-method payload portion 220, an argument-is-literal payload portion 222, an overflow-check-selection payload portion 224, a dynamic-indexed-property payload portion 226, a dynamic-method-group payload portion 228, a static-method-group payload portion 230. It will be appreciated that a given embodiment may include two, three, four, five, or six, and so on, of these payload portions. Also, a given payload portion 200, or a given set of payload portions 200, may reside in one or more payload 304 structures.

A given embodiment may include one or more enhanced compilers 122, and may include one or more enhanced run-time binders 126, for respective programming languages. In particular, some systems include a C# (a.k.a. C-sharp) compiler enhanced to generate payload portion(s) 200, and a C# run-time binder enhanced to perform binding based on the content of payload portion(s) 200.

In some embodiments peripherals 106 such as human user I/O devices (screen, keyboard, mouse, tablet, microphone, speaker, motion sensor, etc.) will be present in operable communication with one or more processors 110 and memory 112. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable storage nonvolatile media, for example storage medium 114 of FIG. 1, or other information storage-retrieval and/or transmission readable media 108 as disclosed in FIG. 1, or an embodiment in a computer system may operate without communicating with other computer systems.

Methods

Figure 3:
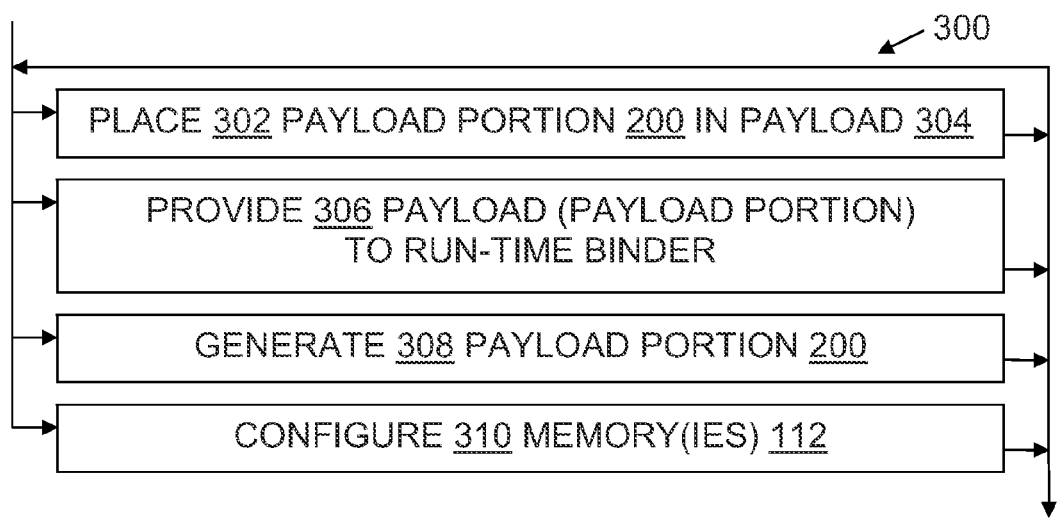
FIG. 3 is a flow chart illustrating steps of some method and configured storage medium embodiments.

FIG. 3 illustrates some method embodiments in a flowchart 300. Methods shown in the Figures may be performed in some embodiments automatically, e.g., by a compiler 122 and a run-time binder 126 under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a payload portion placing step 302, an embodiment places a payload portion 200 in a payload 304. The payload 304 may have a format compatible with familiar payloads generated in .NET languages, for example. In some embodiments, payload portions include expression tree(s), such as DLR trees; in some embodiments, payload portions are included within expression tree(s). Step 302 may be accomplished by building a payload portion 200 in a memory buffer and then copying the completed payload portion into a payload 304, or by building the payload portion 200 piece by piece within a payload 304, for example.

During a payload portion providing step 306, a payload portion 200 is provided to a run-time binder 126. Step 306 may be accomplished by providing the run-time binder with a payload 304 containing the payload portion 200. Memory copying, reference address copying, and/or other mechanisms used to deliver familiar payloads to familiar run-time binders may be used or readily adapted to provide enhanced run-time binders with payload portion 200.

During a payload portion generating step 308, an enhanced compiler 122 generates a payload portion 200. Placing step 302 may be considered part of generating step 308, in conjunction with the specific syntactic and/or semantic analysis needed to obtain the compile-time context data being placed 302.

During a memory configuring step 310, a memory 112 is configured by a payload portion 200, an enhanced compiler 122, an enhanced run-time binder 126, or otherwise in connection with preservation of compile-time context for dynamically bound operations as discussed herein.

The foregoing steps and their interrelationships are discussed in greater detail below, in connection with various embodiments.

Some embodiments provide a method for transforming selected compile-time context data into a semantics payload for operation binding at run-time. The method includes placing 302 in a semantics payload 304 at compile-time at least one payload portion 200, and providing 306 the semantics payload (and hence the payload portion 200) to an enhanced run-time binder 126.

A compound-operation-event-add payload portion 202 supports a program construct of the form d.P+=h. In some embodiments, the payload portion 202 contains an invocation to a run-time-evaluated method to check whether d.P evaluates to an event, an invocation to a mechanism to add an event in case d.P evaluates to an event, and information to perform a compound add assignment operation in case d.P does not evaluate to an event.

A compound-operation-event-remove payload portion 204 supports a program construct of the form d.P−=h. In some embodiments, payload portion 204 contains an invocation to a run-time-evaluated method to check whether d.P evaluates to an event, an invocation to a mechanism to remove an event in case d.P evaluates to an event, and information to perform a compound remove assignment operation in case d.P does not evaluate to an event.

A compound-operation-delegate-combine payload portion 206 supports a program construct of the form d.P+=h. In some embodiments, payload portion 206 contains an invocation to a run-time-evaluated method to check whether d.P evaluates to a delegate, an invocation to a mechanism to combine a delegate in case d.P evaluates to a delegate, and information to perform a compound add assignment operation in case d.P does not evaluate to a delegate.

A compound-operation-delegate-remove payload portion 208 supports a program construct of the form d.P−=h. In some embodiments, payload portion 208 contains an invocation to a run-time-evaluated method to check whether d.P evaluates to a delegate, an invocation to a mechanism to remove a delegate in case d.P evaluates to a delegate, and information to perform a compound remove assignment operation in case d.P does not evaluate to a delegate.

A member-accessibility payload portion 210 indicates where an access originated. For instance, in some embodiments, the payload portion 210 contains a type specifying a location of an accessible private member.

A dynamic-typed-object payload portion 212 contains an indication that an object is statically defined to have a dynamic type to be determined at run-time. Such objects may be identified in C# by the keyword "dynamic", for example.

A struct-by-ref payload portion 214 supports a program construct of the form s.M(d) where s is a struct type, d is a dynamically typed variable, and M is a method on s. In some embodiments, the payload portion 214 contains an express indication that struct s is to be passed by ref rather than by value.

An argument-by-name payload portion 216 contains a source code name of a method argument which is specified by name rather than by position in a method invocation in source code 120.

In some embodiments, an extension-method-scope payload portion 218 contains an express indication that an extension method to be dynamically bound is in scope at compile time. In some embodiments, payload portion 218 contains a list of using clauses. In some embodiments, payload portion 218 contains instead a list of types on which viable extension methods could be located at compile time. The list is arranged so the runtime can duplicate the search strategy that the compiler would have used. In some embodiments, an extension-method-scope payload portion 218 contains a set of extension methods in scope of a dynamically bound method call which includes all extension methods that the call could possibly bind to.

As to extension method binding, in some embodiments extension methods are brought into scope of a call site by being declared locally in the same source, or by being imported through using clauses. In order to bind to extension methods dynamically, the payload for a method call includes information about which extension methods were in scope at compile time, e.g. by holding on to and providing 306 the list of using clauses.

In some embodiments, a conditional-compiled-method payload portion 220 contains an express indication whether a method is defined in source code as being subject to conditional compilation. In some embodiments, a conditional-compiled-method payload portion 220 contains compilation symbol values for a set of compilation symbols which includes all compilation symbols used in conditional attributes on all conditional methods that the call could possibly bind to.

An argument-is-literal payload portion 222 contains an express indication whether a method argument is a literal constant, such as a flag indicating that the method argument is a literal constant, for example.

An overflow-check-selection payload portion 224 contains an express indication whether an operation is to be checked for overflow, such as a flag indicating that the operation is not to be checked, for example.

A dynamic-indexed-property property payload portion 226 may be viewed in some embodiments as an amalgamation of the familiar GetMember payload and the familiar Get/Setindex payload. Accordingly, the payload portion 226 contains the indexer arguments as well as the name of the property that is being indexed. In some embodiments, the payload portion 226 looks like one of the familiar indexer payloads, except that it has a name, and an enhanced compiler may emit a payload portion 226 whenever that compiler sees something that could be an indexed property. This may be reminiscent of the way familiar systems currently produce InvokeMember. For instance, if the code looks like "d.M(1); //Compiler produces InvokeMember" then at runtime, there are one of two successful cases. Either (i) d has a member called M that is invokable, like a delegate, in which case the system conceptually does GetMember and then Invoke, or (ii) d has methods called M, in which case the system resolves the arguments and just calls M. Since either case can happen, one can kind of think of InvokeMember as a compound payload, and any source code of the form d.M(1) causes the compiler to generate a payload with InvokeMember, to be decomposed at run-time if necessary. Similarly, support for indexed properties, such as code of the form "var x=d.Foo[1];" causes an enhanced compiler 122 to used a GetNamedIndex and generate 308 a new compound payload portion 226. Payload portion 226 would either (i) GetMember a member called Foo that is indexable and then Getindex it, or (ii) find a named indexer and use that named indexer. By contrast an unenhanced compiler simply emits GetMember followed by Getindex and doesn't support named indexers.

A dynamic-method-group payload portion 228 supports non-invoked dynamic method groups and corresponding delegate conversions. Assume code of the form "dynamic d= . . . ; var x=d.M;", where d.M binds to a method group. In this case, the payload portion could be the same as a familiar invoke member payload, except that the system would return an internal data structure representation that is a callable object. Then when the user invokes the result (stored in x in this example), the callable object would be invoked. One scenario here involves "Action<object> del=d.M;". In some embodiments, the payload would be a GetMember (as though M were a property), but would additionally contain the desired delegate type, in this case Action<object>. If the enhanced run-time binder has that extra piece of information it could do the work to create and return a delegate even if M were the name of a method on the receiver d. In other embodiments, the payload portion 228 includes an intermediate dynamic object that represents the method group abstractly and permits dynamic conversions to various delegate types.

A static-method-group payload portion 230, for non-invoked static method groups and their dynamic delegate conversions resembles dynamic-method-group payload portion 228. However, an example of the code supported by payload portion 230 is "dynamic d=Console.WriteLine;". The payload portion 230 could look the same as payload portion 238, except that it would be marked with an indication that the method group on the right hand side represents a group of static methods. In another scenario, "static method group" means a method group that is known as such by the compiler, such as x.ToString or Console.WriteLine. Thus, an example of supported code is "dynamic d=x.ToString". However, allowing this would be a substantial change to the way the language currently treats method group conversions.

Configured Media

Some embodiments include a configured computer-readable storage medium 114, which is an example of a memory 112. Memory 112 may include disks (magnetic and optical), RAM, EEPROMS or other ROMs, and/or configurable memory. The storage medium which is configured may be in particular a removable storage medium 114 such as a CD, DVD, or flash memory. A general-purpose memory 112, which may be removable or not, and may be volatile or not, can be configured into an embodiment using items such as enhanced compiler(s) 122, enhanced runtime binder(s) 126, and/or payload portions 200-230, in the form of data 118 and instructions 116, read from a removable storage medium 114 and/or a network connection, to form a configured medium. The configured memory 112 is capable of causing a computer system to perform method steps for transforming data through capturing and providing compile-time context for run-time binding as disclosed herein. FIGS. 1 through 3 thus help illustrate configured storage media embodiments and method embodiments, as well as system and method embodiments. In particular, any of the method steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Portions of this document are adapted from blog entries by inventor(s), which will be identified in the official record. Some blog informalities have been retained, such as a conversational tone. However, the present document governs and is self-contained with respect to substantive matters, including technical disclosure. The blog entries are merely acknowledged as sources; they are not incorporated by reference.

An aspect of C# version 4.0 is the dynamic late binding feature. This feature allows you to tell the compiler that the thing that I'm returning really ought to be treated like a dynamic type, and that any dispatch on it should be done dynamically. The runtime will then do the binding for you based on the runtime type of the object instead of the static compile time return type, and if the binding succeeds, then the code will succeed.

One implementation of dynamic late binding introduced a dynamic type into the type system. This type indicates to the compiler that all operations based on the type should be bound dynamically and not at compile-time. Some embodiments of the system 102 include a C# runtime binder which does the late binding for you. Some systems also make usage of the DLR and use of caching and dynamic dispatch capabilities, so that you can interop with dynamic objects, such as objects created from Iron Python As to the dynamic type, in order to start using the dynamic binding, a mechanism is provided to signify to the compiler that we want our object or expression to be bound dynamically. Enter the dynamic type. The dynamic type is in some ways a regular type that you can use in your code to denote local variables, fields, method return values, and so on. It tells the compiler 122 that everything to do with that object or expression should be done dynamically. Consider the following Example Alpha code:

```
static void Main(string[ ] args)
{
    dynamic d = SomeInitializingStatement;
    d.Foo(1, 2, 3);      //  (1)
    d.Prop = 10;         //  (2)
    var x = d + 10;      //  (3)
    int y = d;           //  (4)
    string y = (string)d; //  (5)
    Console.WriteLine(d); //  (6)
}
```

In Example Alpha, each of the statements has some element of the dynamic type flowing through it, and is therefore dispatched dynamically. Let's consider each of them.

(1) Since the receiver in this example is typed dynamic, the compiler 122 will indicate to the runtime binder 126 that it needs to bind some method named "Foo" on whatever the runtime type of d happens to be, with the arguments {1, 2, 3} applied to it.

(2) This line of Example Alpha also has a dynamic receiver, and so the compiler 122 indicates to the runtime binder 126 that it needs to bind a property-looking-thing (could be a field or property) named "Prop", and that it wants to set the value to 10.

(3) In this line of Example Alpha, the operator "+" becomes a dynamically bound operation because one of its arguments is dynamically typed. The runtime binder 126 then does the normal operator overload resolution rules for "+", finding any user-defined operators named "+" on the runtime type of d, and considering that along with the regular predefined binary operators for int.

(4) In this line of Example Alpha, we have an implicit conversion from the runtime type of d to int. The compiler 122 signifies to the runtime binder 126 that it should consider all implicit conversions on int and on the runtime type of d, and determine if there is a conversion to int.

(5) This line of Example Alpha highlights an explicit conversion to string. The compiler 122 encodes this cast and tells the runtime binder 126 to consider explicit casts to string.

(6) In this line of Example Alpha, despite the fact that we're calling a statically known method at compile time, we have dynamic arguments. As such, we cannot perform overload resolution correctly at compile-time, and so the dynamic-ness of d flows out to its containing call, and we end up dispatching Console.WriteLine dynamically as well.

There are several other scenarios that dynamic flows out to, but these give a general idea of what the dynamic type's implications are. Note that the dynamic type can be viewed as syntactic sugar to signify to the compiler 122 that it should treat bindings dynamically. In metadata, dynamic is just object with an attribute signifying its dynamic nature.

Consider what happens at compile-time. For each dynamic operation, the compiler 122 generates calls into the DLR 128, and takes advantage of its call sites. The DLR call site takes a set of standard actions which indicate what type of dynamic action we want to take. The C# compiler 122 emits a subclass of these standard actions, annotated with some C# specific details, and emits invocations of the call sites in place of the call that the user makes. For instance, in the following Example Beta, code gets translated into pseudocode:

```
// This example source code...
static void Main(string[ ] args)
{
    dynamic d = SomeInitializingStatement;
    d.Foo(1, 2, d);
}
// ...transforms into pseudocode such as this:
static void Main(string[ ] args)
{
    dynamic d = SomeInitializingStatement;
    _csharpCallAction = new CSharpCallAction("Foo");
    _dlrSite<T> = new Site<T>(_csharpCallAction);   // Create the site.
    _dlrSite.Target(1, 2, d);   // Invoke the delegate.
}
```

Note that in Example Beta the site creation pseudocode specifies a generic argument, T. This generic argument is a delegate type that represents the signature of the call. So the call takes two integer arguments and a dynamic argument, and has a dynamic receiver. T would then be a delegate that represents that call. Invoking the delegate invokes the C# runtime binder 126, which binds the expression based on the run-time types of the arguments and the receiver.

As an Example Gamma, assume the following class definition:

```
class C
{
    public dynamic MyMethod(dynamic d)
    {
        return d.Foo( );
    }
}
```

In Example Gamma, one method includes some dynamic params as well as a single "dynamic call site" to call the method Foo. Reflector tells you that the assembly actually looks something like this (simplified a bit):

```
class C
{
    [return: Dynamic]
    public object MyMethod([Dynamic] object d)
    {
        if (MyMethodo_SiteContainer0.p_Site1 == null)
        {
            MyMethodo_SiteContainer0.p_Site1 =
                CallSite<Func<CallSite, object, object>>
                .Create(new CSharpCallPayload(
                    CSharpCallFlags.None, "Foo", typeof(object),
null,
                    new CSharpArgumentInfo[ ] {
                        new
CSharpArgumentInfo(CSharpArgumentInfoFlags.None,
                            null) }));
        }
        return MyMethodo_SiteContainer0.p_Site1
            .Target(MyMethodo_SiteContainer0.p_Site1, d);
    }
    [CompilerGenerated]
    private static class MyMethodo_SiteContainer0
    {
        public static CallSite<Func<CallSite, object,
object>> p_Site1;
    }
}
```

As you can see, the publicly visible members that use the type dynamic actually, behind the scenes, use the type object when they are emitted. There is no framework type "dynamic." However, those "objects" are all decorated in such a way that the compiler 122 or another tool 124 can tell that they are meant to be handled dynamically.

There is also a static field to hold one of the DLR's dynamic call sites for each dynamic operation that you perform. In this case, there is just one, and it corresponds to the method call to Foo. It is initialized inline with the code that uses it in a lazy manner, and invoked with the "Target" field which is actually a delegate that does the right work.

Now consider what happens at run-time. When the DLR delegate of Example Beta gets invoked, it does the following:

Step 1. The DLR 128 checks a cache to see if the given action has already been bound against the current set of arguments. So in Example Beta, we would do a type match based on argument values 1 and 2, and on the runtime type of d. If we have a cache hit, then we return the cached result.

Step 2. If we do not have a cache hit, then the DLR checks to see if the receiver is an IDynamicObject. IdynamicObjects are basically objects which know how to take care of their own binding, such as COM IDispatch objects, real dynamic objects such as Ruby or Python ones, or some .NET object that implements the IDynamicObject interface. If it is any of these, then the DLR calls off to the IDynamicObject and asks it to bind the action. A result of invoking the IDynamicObject to bind is an expression tree that represents the result of the binding.

Step 3. If it is not an IDynamicObject, then the DLR calls into the language binder (in our case, the C# runtime binder 126) to bind the operation. The C# runtime binder will bind the action, and will return an expression tree representing the result of the bind.

Step 4. Once step 2 or step 3 have happened, the resulting expression tree is merged into the caching mechanism so that any subsequent calls can run against the cache instead of being rebound.

Steps 1, 2, and 4, deal with the DLR 128 specifics. Below we elaborate on what happens in step 3.

Regarding the C# runtime binder 126, in some cases the C# runtime binder uses reflection to populate its internal symbol table to determine what to bind to. Each of the C# specific actions (implemented in payloads 304) encodes the type of the binding, along with extra information that allows the system 102 (including run-time binder(s) 126) to determine how to bind the action.

For example, if the argument is known at compile-time to have a static type, then that type will be marked in the payload 304 for the C# action, and will be used as the type of the argument during runtime binding. If it is known at compile-time to be typed dynamic (e.g., it is a variable of type dynamic, or is an expression that returns dynamic), then the runtime binder 126 will use reflection to determine its runtime type and use that type as the type of the argument.

The runtime binder 126 populates its symbol table as needed. For instance, in Example Beta, we were calling the method Foo. The runtime binder will load all members named Foo on the type of the receiver into the symbol table. It then populates the necessary conversions for each of the argument types. Since we may need to coerce the arguments to types that match the method calls (using user-defined conversions as necessary), the binder loads those conversions into the symbol table as well. It then performs overload resolution exactly like the static compiler does. That means that we get the exact same semantics as the static compiler. It also means that we get the same error semantics and messages—a failed binding at runtime results in an exception being thrown, which encapsulates the error message that you would have gotten at compile-time. The binder then takes the result of overload resolution and generates an expression tree that represents the result, and returns that back to the DLR 128. We can break down what the compiler 122 does into three parts: type and member declarations with dynamics (e.g., methods that return dynamic), binding and lookup, and emitting. We'll deal now with the binding aspects of dynamic.

Dynamic binding itself can be broken into two scenarios. Consider the following Example Delta.

```
static void Main(string[ ] args)
{
    dynamic d = 10;
    C c = new C( );
    //   Part (1) -- Dynamic receivers.
    d.Foo( );   // Call.
    d.PropOrField = 10;   // Property.
    d[10] = 10;   // Indexer.
    //   Part (2) -- Statically typed receivers
    //       (or static methods) with dynamic arguments.
    c.Foo(d);   // Instance method call.
    C.StaticMethod(d);   // Static method call.
    c.PropOrField = d;   // Property.
    c[d] = 10;   // Indexer.
    d++;   // Think of this as op_increment(d).
    var x = d + 10;   // Think of this as op_add(d, 10).
    int x = d;   // Think of this as op_implicit(d).
    int y = (int)d;   // Think of this as op_explicit(d).
}
```

Consider the first set of examples under Part (1) of Example Delta. Each of these dynamic invocations happen off of the dynamically typed expression. It is clear where the dynamicity comes from, and where it goes.

The second set of examples, under Part (2) of Example Delta, are a little more complex. The use of dynamic is indirect in each of these. Because the argument to each operation is dynamic, the argument dynamicity flows into the containing operation and makes them dynamic as well. As such, the compiler 122 and system 102 overall does a mix of dynamic binding and static binding—it will use the static type of the receiver to determine the set of members to overload on, but will use the runtime types of the arguments to perform overload resolution.

The Part (1) examples are more straightforward to understand, so we'll use this set in much of the following discussion as a foundation for exploring the dynamic feature.

As to dynamic receivers, when the compiler 122 encounters an expression typed dynamic, it knows to treat the subsequent operation as a dynamic operation. Whether an operation is an index get, index set, method call, or the like, the result type of the operation will be determined at runtime, and so at compile-time, the result of the operation must also be dynamic.

The compiler 122 transforms all dynamic operations into a dynamic call site. Transformation includes creating a compiler generated static field on a generated static class that stores the DLR site instance for the invocation, and initializing it as necessary.

The DLR call site is a generic object that is generic on the delegate type of the call. In some embodiments, the creation of the DLR call site takes a CallSiteBinder, which is an object that knows how to perform the specific binding that is required for the call site. The DLR provides a set of standard actions that can be used to take advantage of the DLR's support for interop with dynamic objects. The call site contains a field of type T that is an instance of the delegate type that the site is instantiated with. This delegate is used to contain the DLR caching mechanism, which stores the results of each bind and is used to invoke the resulting operation. Once the call site has been created, the compiler then emits the code to invoke the delegate, passing it the arguments that the user passed to the call site.

Turning to runtime, once the compiler has created the DLR call site, it then invokes the delegate, which causes the DLR to do its work with interop types, and its work with caching. Assuming that we don't have a true IDynamicObject and we don't have a cache hit, the CallSiteBinder that we seeded the DLR site with will be invoked. C# has its own derived CallSiteBinders that will know how to perform the correct binding, and will return an expression tree which will be merged into the DLR call site's target delegate for caching.

One caching mechanism simply checks exact type matches on the arguments. For example, suppose a call: "arg0.M (arg1, arg2, . . . );" and suppose the call has arg0.Type==C, and all the arguments passed to the call are of type int. The cache check would look like the following:

```
if (arg0.GetType( ) == typeof(C) &&
    arg1.GetType( ) == typeof(int) &&
    arg2.GetType( ) == typeof(int) &&
    ...
   )
{
    Merge CallSiteBinder's bind result here.
}
... // More cache checks
else
{
    Call the CallSiteBinder to bind, and update cache.
}
```

Turning now to C# CallSiteBinder creation, as part of dynamic binding it may be helpful to understand what a C#

CallSiteBinder implementation does. In an example, we have three different types of dynamic operations, namely, a call, a property access, and an indexer. Each of these operations has its own unique pieces, but the operations still share much of the common functionality. They all are initialized with a common C# runtime binder 126, and are used by the runtime binder as data objects that describe the action that needs to be bound. We'll call these objects the C# payloads 304.

One way to think of the C# runtime binder is as a mini compiler—it has many of the concepts you'd expect in a traditional compiler, such as a symbol table, and a type system, and much of the functionality as well, such as overload resolution and type substitution.

Let's use the simple example of d.Foo(1) now. Once the runtime binder 126 gets invoked, it is given the payload 304 for the current call site, and the runtime arguments the site is being bound against. The runtime binder takes the types of the all the arguments (including the receiver) and populates its symbol table with those types. The binder then unpacks the payload to find out the name of the operation it's trying to perform on the receiver (in this case, "Foo"), and uses reflection to load all members named "Foo" off of the runtime type of d, putting those members into its symbol table. From there, as a system 102 we have enough information in the binder's internal system to do the binding that the action describes. At this point, we fork off and bind based on the payload's description.

In some embodiments, one criterion is that the runtime binder should have the exact same semantics that the static compiler has. This includes reporting the same set of errors that the compiler would produce, and performing the same set of conversions (user-defined or otherwise).

Accordingly, each payload is bound by the run-time binder 126 exactly as the static compiler 122 would have bound corresponding source code. The result of the bind is an expression tree that represents the action to take if the binding was successful. Otherwise, a runtime binder exception is thrown. The resulting expression tree is then taken and merged into the call site's delegate to become part of the DLR cache mechanism, and is then invoked so that the result of the user's dynamic bind gets executed.

Some embodiments have limitations in the extent to which run-time and compile-time semantics match. For instance, some implementations of the Microsoft Visual Studio® 2010 IDE 136 do not match semantics with regard to lambdas, extension methods, and method groups. Because a way of representing the source of a lambda at runtime without a binding was not implemented, dynamic invocations that contain lambdas produce a compile time error. Because a way of passing in using clauses and scopes during runtime was not implemented, extension method lookup is available. Because there is no implementation of a way to represent a method group at runtime (e.g., there is no MethodGroup type), and because that concept has not been made part of the .NET environment, there is no way implemented to allow method groups to be represented dynamically. This means that you cannot do the following:

```
delegate void D( );
public class C
{
    static void Main(string[ ] args)
    {
        dynamic d = 10;
        D del = d.Foo; // This would bind to a method group
    at runtime.
    }
}
```

Because we cannot represent method groups at runtime, a runtime exception will be thrown if the runtime binder binds d.Foo to a method group.

We return now to Example Delta. We dealt above with the first set of invocations (those with dynamic receivers) in Part (1). We turn now to the second set, in Part (2), which either have static receivers, or have no real apparent receiver.

Take the simplest of this set of invocations and expand it out a bit. Suppose we have something like the following:

```
public class C
{
    public void Foo(decimal x) { ... }
    public void Foo(string x) { ... }
    static void Main(string[ ] args)
    {
        C c = new C( );
        dynamic d = 10;
        c.Foo(d);
    }
}
```

Consider this from a purely intuitive standpoint, as to what one might expect to happen. Since we know the type of our local variable 'c', intuitively, we know that one of the two overloads of Foo on C should be called. However, we also know that d is dynamically typed, so the compiler cannot determine the exact overload to be called until runtime. We would therefore expect the combination of these two to happen—the compiler will determine the candidate set at compile time, and determine which the call should resolve to at runtime. In this case, since d has the value 10 at the time of the call, we would expect the overload of Foo that takes a decimal to be called, since the value 10 is not convertible to type string.

Now expand our example to illustrate what we would not expect to have happen:

```
public class C
{
    public void Foo(decimal x) { ... }
    public void Foo(string x) { ... }
    static void Main(string[ ] args)
    {
        C c = new D( ); // notice change in source here
        dynamic d = 10;
        c.Foo(d);
    }
}
public class D : C
{
    public void Foo(int x) { ... }
}
```

First, notice the subtle change in our source code, highlighted by the comment. We now create an instance of the derived class D. This means that at runtime, the local variable c will be an instance of type D instead of C as in our previous example. Note also that D contains an overload of Foo that is a better match than all of the overloads on C—the value 10 is intrinsically typed int and so D.Foo is the best match.

However, note that although our example instantiates the local variable c within our code, it is easy to imagine a method taking a parameter of type C and being given some other derived class at runtime. We do not expect this to change our candidate set used for overload resolution. Specifically (in compiler terminology), since the call to c.Foo can be bound statically to a method group, we expect the statically determined method group to be the one that is used. The dynamic argument should only serve to influence the resolution of the method group, not to influence the creation of the group itself.

Now consider what actually happens, in at least one embodiment. As mentioned before, one of the design tenets is that with dynamic binding a system 102 behaves exactly as it would at static compile time, with the exception that the type used in place of the dynamic objects (arguments or receiver) is the runtime determined type instead of the compile-time determined one. This means that for all arguments not statically typed dynamic, the compile-time types will be used, regardless of their runtime types.

Applying this rule to our example means that at runtime, we should bind as if the type of the receiver c is C, and the type of the argument d is int. Using these types for overload resolution will yield C.Foo(decimal) as the result.

Consider this slightly more complex example to further illustrate the point:

```
public class C
{
    public void Foo(object x, C c) { ... }
    static void Main(string[ ] args)
    C c = new D( );
        dynamic d = 10;
        c.Foo(d, c);
    }
}
public class D : C
{
    public void Foo(int x, D d) { ... }
}
```

Notice in this example that at runtime, c contains an instance of type D, and d contains the value 10. If we were to use the runtime types for everything involved in the binding at runtime, then the receiver would be type D, with the argument types being int and D respectively. This would yield D.foo (int, D) as the best result, but that's not what we would expect.

Because the only statically-known dynamically typed argument is the first argument d, it is the only one that has its runtime type used by the system 102. The rest of the arguments to the call (the receiver c, and the second argument c) have their static types used. As such, the only method considered is C.Foo(object, C), which is the method we'd expect to have resolved.

We turn now to a so-called "phantom method". A phantom method is a method that the static compiler will bind to during the initial binding phase when it recognizes that the invocation it's trying to bind needs to be bound dynamically and cannot be resolved statically. The compiler uses rules discussed above to determine what types to use at runtime.

Consider a simple example:

```
public class C
{
    public void Foo(int x)
    {
    }
    static void Main( )
    {
```

-continued

```
        dynamic d = 10;
        C c = new C( );
        c.Foo(d);
    }
}
```

When we try to bind the call to Foo, the compiler's overload resolution algorithm will construct the candidate set containing the sole candidate, C.Foo(int). At that point, we consider whether or not the arguments are convertible. This brings us to the topic of convertibility of the dynamic type.

One way to think about dynamic conversions is that everything is convertible to dynamic, and dynamic is not convertible to anything. This unusual approach makes sense in view of the special handling of dynamic in situations where one would expect convertibility. In such situations, the dynamic type signifies that the conversion is to be done dynamically, and the compiler generates all the surrounding DLR code that prompts a runtime conversion.

For instance, let the local variable "c" denote some static typed local, and the variable "d" denote some dynamically typed expression. Some situations where one would expect convertibility are the following:

1. Overload resolution—c.Foo(d)
2. Assignment conversion—C c=d
3. Conditionals—if (d)
4. Using clauses—using (dynamic d= . . . )
5. Foreach—foreach (var c in d)

Considering overload resolution, for example, brings us back to argument convertibility. Since dynamic is not convertible to anything else, our argument d is not convertible to int. However, since we've got a dynamically typed argument, we want the overload resolution for this call to be bound dynamically, and this brings in the phantom method. The phantom method is a method which is introduced into the candidate set that has the same number of parameters as the number of arguments given, and each of those parameters is typed dynamic.

When the phantom method is introduced into the candidate set, it is treated like any other overload. Recall that dynamic is not convertible to any other type, but all types are convertible to dynamic. Normal overloads will fail due to the dynamic arguments being present, but the phantom method will succeed.

In our example, we have one argument which is typed dynamic. We also have two overloads: Foo(int) and Foo(dynamic). The first overload fails because dynamic is not convertible to int. The second, the phantom, succeeds and so the compiler binds the call to the phantom. Once a call is bound to the phantom overload, the compiler knows to generate the correct DLR code to signal dispatching the call at runtime.

A remaining question is when to introduce the phantom overload. When the compiler performs overload resolution, it considers each overload in the initial candidate set. If the invocation has any dynamic arguments, then for each candidate in the initial set, the compiler checks to see if the phantom overload should be introduced. The phantom will be introduced if (1) all of the non-dynamic arguments are convertible to their respective parameters, and if (2) at least one of the dynamic arguments is not convertible to its respective parameter. Recall that earlier we had said that it would be possible for a call containing a dynamic argument to be dispatched statically instead of dynamically. This is explained by condition (2). If the overload in question contains dynamic parameters for each of the dynamic arguments, then the binding will be dispatched statically. The following example will not yield a dynamic lookup, but will be bound statically:

```
public class C
{
    public void Foo(int x, dynamic y) { ... }
    static void Main( )
    {
        C c = new C( );
        dynamic d = 10;
        c.Foo(10, d);
    }
}
```

Once the compiler has gone through each of the overloads in the initial binding pass, if the phantom has not yet been introduced, then overload resolution will behave as it always has, despite the occurrence of a dynamic parameter.

There is a subtle difference between dispatch signaled from the phantom method and dispatch signaled from a dynamic receiver. With a dynamic receiver, the overloads that the runtime binder will consider are determined based on the runtime type of the receiver. However, with the phantom dispatch, the overloads will be determined based on the compile time type of the receiver. This matches intuition; one would expect that though the arguments are dynamic, the receiver is known at compile time, and so the candidate set that the call can dispatch to should be known at compile time as well. More specifically, one would not expect some overload defined in some derived class (possibly not even defined in one's own source) to be called.

With regard to the semantics around the phantom method, recall that the compiler binds to a phantom method when there is a dynamically typed argument with a static receiver. This raises issues such as what happens when the compiler determines that it needs to bind to a phantom method, what checks the compiler will do, and what checks the compiler arguably should do.

One question is whether the compiler should treat binding against the phantom method as a dynamic operation with some static parts, or as a static operation with some dynamic parts. An example will allow us to consider both views:

```
public class C
{
    static void Main( )
    {
        C c = new C( );
        dynamic d = 10;
        c.Foo(d, 10);
        d.Foo(10, 10);
    }
    public void Foo<T, S>(T x, S y) { }
}
```

The first call is a statically known receiver with a dynamically typed argument. The second call is a dynamically typed receiver with a statically known argument.

Consider the first position, that is, a 'dynamic' phantom. When the compiler binds the call to Foo against a dynamic receiver, it has no knowledge of the receiver's members. It therefore does not check for the existance of a Foo member, and does not perform checks like accessibility, arity, argument convertibility, or method type inference. If the compiler were to consider binding against the phantom method as a dynamic operation with some static parts, then it should treat the first call in the same manner. This means that once the compiler encounters any method call with a dynamic argument, it should stop checking these things against the receiver, even though it knows the receiver's type at compile time and can therefore determine these things. This seems counterintuitive. If the compiler has the information, arguably it should use the information to help give the user good diagnostic messages at compile-time. This approach is not favored here.

Consider the second approach, namely, a 'static' phantom. Under this position, the compiler uses whatever static information it knows to help give diagnostics to the user wherever it can. This means that the compiler should perform name lookup on the receiver to make sure there is a method named Foo on class C; should check that the method Foo is accessible from the current location; and should do an arity check to make sure that there is a Foo that takes two arguments. The compiler also should do method type inference to determine as much information about the type parameters as it can. In our example, this means that the compiler will infer S to be type int, but not be able to infer T. The compiler also should check that any non-dynamic arguments are convertible to their respective parameter types. In our example, this means verifying that the second argument is convertible to type int, since we inferred S to be int. The compiler also should check the constraints of the method type parameters against the argument types.

In short, although one may take the first position, the position favored here is that C# is a static language, so the second position is favored, allowing the compiler to use as much static information as it can.

In some embodiments, for the method call off of a dynamic receiver, the compiler will encode the static types of the arguments so that the static types and not the runtime types will be used for overload resolution.

With regard to method type inference, a question arises as to how the type inference algorithm should be altered to infer the most that it can, giving errors where it can guarantee that the code will never succeed, no matter what the runtime arguments. Some compilers simply ignore type inference. That is, one may skip type inference, and upon encountering a type parameter, assume it is convertible at compile time. This can produce some unexpected behavior. Consider the following example:

```
public class C
{
    static void Main( )
    {
        C c = new C( );
        dynamic d = 10;
        c.Foo(10, d);
    }
    public void Foo<T>(T t, int x) where T : class { }
}
```

One would expect that this produces a compile time error—the integer 10 given as the first argument will never satisfy the constraints to the type parameter T. However, one implementation currently allows this call to compile successfully and fail at runtime.

One alternative modifies the type inference algorithm's behavior when it sees dynamically typed arguments. A previous type inference algorithm has two results: pass or fail. We introduce a third result: inconclusive. If the type of the argument is dynamic, then take all type parameters in the corresponding parameter's constructed type and mark them as inconclusive. No errors will be reported on inconclusive type parameters, and no constraint checks will be performed on them in the constraint checking phase. Note that this approach says nothing about types constructed over dynamic. For example, if we supplied an argument of type List<dynamic> to a parameter expecting an IEnumerable<T> where T: struct, then we would not mark T as inconclusive, and therefore report the error that the constraint is not satisfied.

Now consider a more complex scenario:

```
public interface IAnimal { }
public interface IWatcher<in T> { }
public class Watcher<T> : IWatcher<T> { }
public class C
{
    static void Main(string[ ] args)
    {
        C c = new C( );
        IWatcher<Giraffe> a = new Watcher<Giraffe>( );
        IWatcher<Monkey> b = new Watcher<Monkey>( );
        dynamic d1 = 10;
        dynamic d2 = new Watcher<Mammal>( );
        IWatcher<dynamic> d3 = new Watcher<dynamic>( );
        c.Bar(a, b, d1); // (1)
        c.Bar(a, b, d2); // (2)
        c.Bar(a, b, d3); // (3)
    }
    public void Bar<T>(IWatcher<T> w1, IWatcher<T> w3,
    IWatcher<T> w2) where T : IAnimal { }
}
public class Mammal : IAnimal { }
public class Giraffe : Mammal { }
public class Monkey : Mammal { }
```

In this code, the first two examples contain an argument that is typed dynamic. However, notice that we cannot simply ignore the dynamic argument and ignore the third parameter for method type inference. If we were to do that, the type inference algorithm would first determine that the candidate set for T is {Giraffe, Monkey}. However, even though there is a common base class (Mammal), C#'s type inference algorithm requires that the base class be in the candidate set in order for a successful inference. Type inference would therefore fail at compile time. In the first call, this is fine—runtime type inference would also fail on the call. However, the second call will succeed at runtime. Because the runtime type of d2 is Watcher<Mammal>, Mammal is added to the candidate set. And because IWatcher is covariant on T, choosing T to be Mammal satisfies argument convertibility for each of the three arguments. The third call will fail at compile-time, because the candidate set for T is {Giraffe, Monkey, dynamic}, and T is not marked inconclusive. Type inference will infer T to be dynamic, since it is the common base class and IWatcher is covariant. However, constraint checking will fail, since dynamic is not an IAnimal.

Turning now to further discussion of some specific dynamic operations, some embodiments operate as follows.

As to properties, named properties take the form d.Foo, where d is some dynamic object and Foo is some name for some field or property that lives on the runtime type of d. When the compiler 122 encounters this, it encodes the name "Foo" in the payload, and instructs the runtime binder 126 to bind off of the runtime type of d.

However, named properties are always used in context. You can do one of three things with a named property: access the value, assign a value to the member, or do both (compound operations, such as += and −=). The compiler in some embodiments will thus encode the intent of the usage in the payload as well, so that the runtime will allow you to bind to a get-only property only if you're trying to access it, and will throw you an error if you're trying to assign to it.

One thing to note in some embodiments is that the compiler will treat any named thing the same, and allow the runtime to differentiate between properties and fields. Note also that the return type of a named property is dynamic at compile-time.

As to indexers, in some embodiments you can think of indexers in one of two ways—properties with arguments, or method calls with a set name. The latter view is more useful when we're dealing with dynamic. The reason is that just like method calls, even if the indexer itself can be statically bound, any dynamic arguments that don't directly map to dynamic can cause the phantom overload to come into play, and cause a late binding based on the static type of the receiver, and the dynamic types of the arguments.

Indexers still do have some similarities to properties however—they're always used in context. As such, in some embodiments the compiler 122 again will encode whether or not the user is accessing the value of the indexer, setting a value, or performing a compound operation into the payload for the binder to use. Note also that the return type of indexers is dynamic at compile-time.

As to conversions, although dynamic is not convertible to any other type, there are certain scenarios in which we allow it to be convertible. Assignments, condition expressions, and for each iteration variables are a few examples. These payloads are relatively simple; because the compiler already knows the type that we're attempting to convert to (the type of the variable you're assigning to), it encodes the conversion type in the payload, indicating to the runtime binder that it should attempt all implicit (or explicit if it's a cast) conversions from the runtime type of the argument to the destination type.

Note that user-defined conversions will be applied as well, consistent with the goal of having the run-time semantics behave just like the compile-time ones. Thus, argument conversions for overload resolution and so forth happen as one would expect in light of the discussion herein. The destination type is returned at compile-time; conversions thus may be the only situation involving dynamic, of those discussed above, which has a non-dynamic return type at compile-time.

As to operators, at first glance, it may be hard to tell that anything dynamic is going on. However, a simple statement like d+1 still needs to be dispatched at runtime, because user-defined operators can come into play. As such, any operation that has a dynamic argument will be dispatched at runtime. This includes all of the in place operators as well (+=, −=, and so on). Note that in some embodiments the compiler will figure out if you've got a member assignment (e.g., d.Foo+=10) or a variable assignment (e.g., d+=10), and figure out if it needs to pass d by ref to the call site so that it can be mutated. Note also that structs will get mutated as well. So if we were to do:

```
public struct S
{
    public int Foo;
}
public class C
{
    static void Main( )
    {
```

```
            dynamic d = new S( );
            d.Foo += 10;
        }
    }
``` the result would be that d would point to a struct who's Foo member is set to 10.

Also, note that the compiler 122 knows that if you're doing something like d.Foo+=x, and at runtime the binder 126 binds d.Foo to a delegate type or an event type, then the correct combine/add call will be invoked.

As to delegate invocation, in some embodiments the invocation syntax is very much like a method call. The only difference is that the name of the action is not explicitly stated. This means that just like calls, both of the following examples would end up causing runtime dispatches:

```
public class C
{
    static void Main( )
    {
        MyDel c = new MyDel( );
        dynamic d = new MyDel( );
        d( );
        c(d);
    }
}
```

The first example above causes a runtime dispatch of an invoke that takes no arguments. At runtime, the binder 126 will check to verify that the recevier is indeed a delegate type, and then perform overload resolution to make sure the arguments supplied match the delegate signature.

The second example above causes a runtime dispatch because the argument specified is dynamic. The compiler 122 determines at compile-time that we have an invoke of a delegate, since c's type is a delegate, but the actual resolution is done at runtime.

With regard to mutating values using dynamic, consider the following code:

```
static void Main( )
{
    dynamic d = 10;
    d++;
}
```

The question arises of what should happen with this code. Intuitively, we'd expect d to contain the value 11. However, recall that in some embodiments, dynamic is implemented as object. That means that the first line will generate a boxing conversion from int to object. The local variable d contains a boxed copy of the integral value specified. The second line, then, is really an application of the ++ operator on the local variable d. At runtime, calling operator ++ on d will result in an unbox of the object d into an integer, and a call to the operator ++ on the unboxed value. But this value is not copied back inside the box. Thus, it turns out that what you expect to happen isn't really what would happen if one naively implemented this in the runtime binder. This naïve implementation is not preferred here for C# tools. Instead, an alternative embodiment passes things by ref to the runtime binder so that the runtime binder can write back into the value. One does still have the challenge of boxed structs. However, the architecture of the runtime binder allows one to return expression trees to the DLR 128. There is an expression tree that performs an unbox and modifies the boxed value, and puts that value back into the box, allowing you to mutate the boxed values of these things.

With regard to nested struct mutation, one may take an example to the next level. Because of the nature of one architecture, dotted expressions get broken up into parts and bound in segments. So that means that for the expression A.B.C.D, the compiler will encode a site for A.B, use that result as the receiver for a second site for C, and use the result of that as the receiver for the third site for .D. This is the same architecture that the compiler uses when binding. However, the runtime architecture implementation has the limitation that it does not have the ability to return values by ref. The Microsoft Common Language Runtime has adequate support, but this limitation arises in the .NET languages as none of them provide the ability to have ref returns. This means that if any of the dotted expressions were to bind to a value type, that value will be boxed (and hence a copy would be made), and further dots into it would be made on the copy of the value, and not the initial value as would be expected. Consider the following code:

```
public struct S
{
    public int i;
}
public class D
{
    public S s;
    public static void Main( )
    {
        dynamic d = new D( );
        d.s = default(S);
        d.s.i = 10;
        Console.WriteLine(d.s.i);
    }
}
```

We would intuitively expect the value '10' to be printed in the console. However, the value '0' is printed instead, in one implementation. Accordingly, it is prudent to remember that dynamic is like object in such implementations, and in particular, that boxing happens.

With regard to base calls, the Microsoft Common Language Runtime prevents the compiler from generating non-virtual calls on virtual methods from outside the class. Since the runtime binder lives outside of the class that the user is calling a method on, and the delegate that it compiles lives outside the type, we are not allowed to do this in some embodiments. The same restriction actually holds true for Expression Trees. We had to put in a workaround for the expression tree ( )=>base.Foo( ) by essentially generating a stub method on the current type that does the base call for you, and then generating the call to that stub method from the expression tree. This technique works for expression trees, and could work for dynamic as well, but since the overload resolution happens at runtime, one would generate a stub method for each overload that this occurs in. This means that there is no way in such implementations to call a base overload dynamically. One cannot call a base call with any dynamically typed arguments, as it will trigger a dynamic binding.

One alternative would be somewhat akin to the solution performed for lambdas. Recall that if you had the lambda: x=>base.M(x), the compiler will generate a private method that performs the call to the base access, and will have the lambda body call the generated method. However, for lambdas, we knew exactly which call the user was trying to make. In the dynamic scenario, we would be doing overload resolution at runtime, and so we would have to generate a base call stub for each possible overload. Some embodiments opt not to do this and simply give a compile-time error when the user attempts to make a base call with any dynamic arguments.

With regard to explicitly implemented interface methods, note that interfaces are compile-time constructs, and have no runtime representation. Consider the following:

```
interface IFoo
{
    void M( );
}
class C : IFoo
{
    void IFoo.M( ) { }
}
```

Because of the way the compiler implements explicitly implemented interfaces, C.M gets its name removed, making it uncallable via a C pointer. The name doesn't get wiped clean—it gets fully qualified. This means that there is no method named "M" on C, but rather there is a "IFoo.M" on it. There are two major reasons to keep this limitation. The first is that explicit interface implementations were meant to be views on the object through an interface view. But at runtime, there are no interfaces, and hence no views. The second and perhaps more compelling reason is that a class may implement several interfaces that have the same overload, and can explicitly implement all of those methods. At that point, which method should we be picking? They all have the same signature, and all have much the same name (IFoo.M, IBar.M, and so on). Without the interfaces, there is no way to differentiate between them. This is fine at compile-time, because the compiler can see when a receiver is known to be an IFoo pointer. However, at runtime, there is no notion of interfaces, and so there is no IFoo available for the runtime binder to use to dispatch methods. Combined with the fact that C.M's name has been removed, this makes the method entirely uncallable dynamically.

With regard to accessibility, in some configurations an implementation of dynamic performs accessibility checks only on the member that you are accessing. This means that the runtime binder checks to verify that any member you're trying to use is public. Namely, we do not do accessibility checks on the type itself (if you really ought to be able to access the type of the object in your current context, or should it just look like an opaque object to you), and do not allow any non-public members to be used dynamically. A disadvantage of this scenario is that you could make a call with a static receiver to a private method that you know you can access from your context, but because a dynamic argument is given, the runtime binder will prevent you from calling the method. Below is an example:

```
public class C
{
    private void M(int x) { }
    static void Main( )
    {
        dynamic d = 10;
        C c = new C( );
```

```
        c.M(d);
    }
}
```

When the compiler encounters this expression at compile-time, it will do the verification and know that C.M is accessible from the calling context, but because the argument is dynamic, the call gets resolved at runtime. Because of the public-only policy of the current binder, overload resolution will not bind to the method.

As to compound operation binding, in some embodiments the C# compiler encodes any dynamic compound operation of the form x.Foo op=y as a single call site. This allows us to evaluate at runtime the type of x.Foo, and depending on the operation, take C#-specific actions. The C# language specifies that if x.Foo evaluates to an event or delegate, and the operation is + or −, then the operation is evaluated as a call to add_event/remove_event or delegate.Combine/delegate.Remove respectively. Otherwise, the operation is simply evaluated as x.Foo=x.Foo op y.

In some embodiments, the semantic payload 304 is transmitted through the dynamic language runtime to the participants in the runtime binding process, the C# runtime binder 126 being one such participant. The semantic payload contains enough information (accessible through a common well defined interface) for other possible participants in the dynamic operation to understand (to some degree) what operation is being performed. So when C# syntax reads:
a.b+=c
and "a" turns out to be an implementation of Python class, the semantic payload can be partially understood by the Python object at runtime and the Python object would perform the binding.

Advantages and disadvantages of different embodiments vary. However, without appropriate payload portions 200, some desired results may be difficult to achieve, or unavailable. For example, one could not bind C# events without appropriate payload portions. That means that a call to d.Foo +=x; would fail if d.Foo binds to an event. One also could not have literal conversions. For example, the literal constant 0 is convertible to enum, so you could not do something like: d.MyEnum=0. One also would not have the correct overflow behavior on dynamic operations. One would either have to pick that all dynamic operations are checked, or they are all unchecked. One also would not have the ability to call anything other than public members off of dynamic invocations. One also wouldn't get the same overload semantics at run-time as at compile-time (e.g., a different overload may be chosen). Also, operations on structs would not permeate properly. So for example, if one had some dynamic local variable that was a boxed struct, any mutating dynamic operations on it would not persist. Also, without appropriate payload portions one could not use the named argument feature for dynamic invocations.

CONCLUSION

Although particular embodiments are expressly illustrated and described herein as methods, as configured media, or as systems, it will be appreciated that discussion of one type of embodiment also generally extends to other embodiment types. For instance, the descriptions of methods in connection with FIG. 3 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method of transforming selected compile-time context data into a semantics payload for operation binding at run-time, the method comprising the steps of:

placing in a semantics payload at compile-time at least one of the following payload portions:

a compound-operation-event-add payload portion for a program construct of the form d.P+=h, where d.P is a dynamically typed expression, said payload portion containing an invocation to a run-time-evaluated method to check whether d.P evaluates to an event, an invocation to a mechanism to add an event in case d.P evaluates to an event, and information to perform a compound add assignment operation in case d.P does not evaluate to an event;

a compound-operation-event-remove payload portion for a program construct of the form d.P −=h, where d.P is a dynamically typed expression, said payload portion containing an invocation to a run-time-evaluated method to check whether d.P evaluates to an event, an invocation to a mechanism to remove an event in case d.P evaluates to an event, and information to perform a compound remove assignment operation in case d.P does not evaluate to an event;

a compound-operation-delegate-combine payload portion for a program construct of the form d.P+=h, where d.P is a dynamically typed expression, said payload portion containing an invocation to a run-time-evaluated method to check whether d.P evaluates to a delegate, an invocation to a mechanism to combine a delegate in case d.P evaluates to a delegate, and information to perform a compound add assignment operation in case d.P does not evaluate to a delegate;

a compound-operation-delegate-remove payload portion for a program construct of the form d.P −=h, where d.P is a dynamically typed expression, said payload portion containing an invocation to a run-time-evaluated method to check whether d.P evaluates to a delegate, an invocation to a mechanism to remove a delegate in case d.P evaluates to a delegate, and information to perform a compound remove assignment operation in case d.P does not evaluate to a delegate;

a member-accessibility payload portion indicating where an access originated, thereby allowing a runtime to determine whether an invocation location has access to a specified member;

a dynamic-typed-object payload portion containing an indication that an object is statically defined to have a dynamic type to be determined at run-time;

a struct-by-ref payload portion for a program construct of the form s.M(d) where s is a struct type, d is a dynamically typed variable, and M is a method on s, said payload portion containing an express indication that struct s is to be passed by reference address;

an argument-by-name payload portion containing a source code name of a method argument which is specified by name rather than by position in a method invocation in source code;

an extension-method-scope payload portion containing at least one of: an express indication that an extension method to be dynamically bound is in scope at compile time, a set of extension methods in scope of a dynamically bound method call which includes all extension methods that the call could possibly bind to; and providing the semantics payload to a run-time binder which performs overload resolution by either binding overloaded program items to particular respective implementations after compile-time or by raising a run-time exception or other error condition if no type-compatible resolution is possible with the information available to the binder.

2. The method of claim 1, further comprising providing to a run-time binder an argument-is-literal payload portion containing an express indication whether a method argument is a literal constant.

3. The method of claim 1, further comprising providing to a run-time binder an overflow-check-selection payload portion containing an express indication whether an operation is to be checked for overflow.

4. The method of claim 1, further comprising providing to a run-time binder a dynamic-indexed-property payload portion containing at least one indexer argument and also containing a name of a property that is being indexed.

5. The method of claim 1, further comprising providing to a run-time binder at least one of the following:
- a dynamic-method-group payload portion containing at least one desired delegate type for an invocation of a method of a method group;
- a static-method-group payload portion containing at least one desired delegate type for an invocation of a method of a method group, and also containing an express indication that the method group represents a group of static methods.

6. A computer-readable storage medium configured with data and instructions for performing a method for providing a run-time binder with compile-time context data for a dynamically bound operation, the method comprising the steps of:
- placing in a semantics payload at compile-time at least one of the following payload portions:
  - an argument-is-literal payload portion containing an express indication that a method argument is a literal constant;
  - an extension-method-scope payload portion for an extension method to be dynamically bound, including a list of types on which viable extension method(s) were located at compile time;
  - a struct-by-ref payload portion for a program construct of the form s.M(d) where s is a struct type, d is a dynamically typed variable, and M is a method on s, said payload portion containing an express indication that struct s is to be passed by reference address; and
- providing the semantics payload to a run-time binder which performs overload resolution by either binding overloaded program items to particular respective implementations after compile-time or by raising a run-time exception or other error condition if no type-compatible resolution is possible with the information available to the binder.

7. The configured medium of claim 6, wherein the method further comprises providing, to the same or another run-time binder, an argument-by-name payload portion containing a source code name of a method argument which is specified by name rather than by position in a method invocation in source code.

8. The configured medium of claim 6, wherein the method further comprises providing, to the same or another run-time binder, a member-accessibility payload portion indicating where an access originated, thereby allowing a runtime to determine whether an invocation location has access to a specified member.

9. The configured medium of claim 6, wherein the method further comprises providing, to the same or another run-time binder, an overflow-check-selection payload portion containing an express indication that an operation is not to be checked for overflow.

10. The configured medium of claim 6, wherein the method further comprises providing, to the same or another run-time binder, a dynamic-typed-object payload portion containing an indication that an object is statically defined to have a dynamic type to be determined at run-time.

11. The configured medium of claim 6, wherein the method further comprises providing, to the same or another run-time binder, a dynamic-indexed-property payload portion containing at least one indexer argument and also containing a name of a property that is being indexed.

12. The configured medium of claim 6, wherein the method further comprises providing, to the same or another run-time binder, a dynamic-method-group payload portion containing at least one desired delegate type for an invocation of a method of a method group.

13. The configured medium of claim 6, wherein the method further comprises providing, to the same or another run-time binder, a static-method-group payload portion containing at least one desired delegate type for an invocation of a method of a method group, and also containing an express indication that the method group represents a group of static methods.

14. The configured medium of claim 6, wherein the method further comprises providing, to the same or another run-time binder, a compound-operation-event-add payload portion for a program construct of the form d.P+=h, where d.P is a dynamically typed expression, said payload portion containing an invocation to a run-time-evaluated method to check whether d.P evaluates to an event, an invocation to a mechanism to add an event in case d.P evaluates to an event, and information to perform a compound add assignment operation in case d.P does not evaluate to an event.

15. The configured medium of claim 6, wherein the method further comprises providing, to the same or another run-time binder, a compound-operation-delegate-combine payload portion for a program construct of the form d.P+=h, where d.P is a dynamically typed expression, said payload portion containing an invocation to a run-time-evaluated method to check whether d.P evaluates to a delegate, an invocation to a mechanism to combine a delegate in case d.P evaluates to a delegate, and information to perform a compound add assignment operation in case d.P does not evaluate to a delegate.

16. A computer system comprising:
- a logical processor;
- at least one run-time binder configuring memory in operable communication with the logical processor, upon execution the run-time binder performs overload resolution by either binding overloaded program items to particular respective implementations after compile-time or by raising a run-time exception or other error condition if no type-compatible resolution is possible with the information available to the binder; and
- at least one of the following payload portions which also configures memory and is accessible to the run-time binder:
  - a compound-operation-event-add payload portion for a program construct of the form d.P+=h, where d.P is a dynamically typed expression, said payload portion containing an invocation to a run-time-evaluated method to check whether d.P evaluates to an event, an invocation to a mechanism to add an event in case d.P evaluates to an event, and information to perform a compound add assignment operation in case d.P does not evaluate to an event;
  - a compound-operation-event-remove payload portion for a program construct of the form d.P −=h, where d.P is a dynamically typed expression, said payload portion containing an invocation to a run-time-evaluated method to check whether d.P evaluates to an event, an invocation to a mechanism to remove an event in case d.P evaluates to an event, and information to perform a compound remove assignment operation in case d.P does not evaluate to an event;
  - a compound-operation-delegate-combine payload portion for a program construct of the form d.P+=h, where d.P is a dynamically typed expression, said payload portion containing an invocation to a run-time-evaluated method to check whether d.P evaluates to a delegate, an invocation to a mechanism to combine a delegate in case d.P evaluates to a delegate, and information to perform a compound add assignment operation in case d.P does not evaluate to a delegate;
a compound-operation-delegate-remove payload portion for a program construct of the form d.P −=h, where d.P is a dynamically typed expression, said payload portion containing an invocation to a run-time-evaluated method to check whether d.P evaluates to a delegate, an invocation to a mechanism to remove a delegate in case d.P evaluates to a delegate, and information to perform a compound remove assignment operation in case d.P does not evaluate to a delegate;
a member-accessibility payload portion indicating where an access originated, thereby allowing a runtime to determine whether an invocation location has access to a specified member;
a dynamic-typed-object payload portion containing an indication that an object is statically defined to have a dynamic type to be determined at run-time;
a struct-by-ref payload portion for a program construct of the form s.M(d) where s is a struct type, d is a dynamically typed variable, and M is a method on s, said payload portion containing an express indication that struct s is to be passed by reference address;
an argument-by-name payload portion containing a source code name of a method argument which is specified by name rather than by position in a method invocation in source code;
an extension-method-scope payload portion containing at least one of: an express indication that an extension method to be dynamically bound is in scope at compile time, a set of extension methods in scope of a dynamically bound method call which includes all extension methods that the call could possibly bind to;
an argument-is-literal payload portion containing an express indication that a method argument is a literal constant;
an overflow-check-selection payload portion containing an express indication whether an operation is to be checked for overflow;
a dynamic-indexed-property payload portion containing at least one indexer argument and also containing a name of a property that is being indexed;
a dynamic-method-group payload portion containing at least one desired delegate type for an invocation of a method of a method group;
a static-method-group payload portion containing at least one desired delegate type for an invocation of a method of a method group, and also containing an express indication that the method group represents a group of static methods.

17. The system of claim 16, wherein the system comprises a conditional-compiled-method payload portion containing at least one of: an express indication whether a method is defined in source code as being subject to conditional compilation, compilation symbol values for a set of compilation symbols which includes all compilation symbols used in conditional attributes on all conditional methods that the call could possibly bind to.

18. The system of claim 16, wherein the system comprises at least two run-time binders for at least two respective programming languages.

19. The system of claim 16, wherein the system comprises a C-sharp programming language run-time binder.

20. The system of claim 16, wherein the system further comprises a programming language compiler configured to generate at least three of the payload portions.

\* \* \* \* \*